(12) United States Patent
Lin et al.

(10) Patent No.: US 12,573,328 B2
(45) Date of Patent: Mar. 10, 2026

(54) DISPLAY DEVICE AND DISPLAY CALIBRATION METHOD

(71) Applicant: CHAMP VISION DISPLAY INC., Miao-Li County (TW)

(72) Inventors: Kuo-Lung Lin, Miao-Li County (TW); Yi-Wen Lin, Miao-Li County (TW); Chung-Wen Chia, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 316 days.

(21) Appl. No.: 18/134,531

(22) Filed: Apr. 13, 2023

(65) Prior Publication Data

US 2023/0360580 A1     Nov. 9, 2023

(30) Foreign Application Priority Data

May 4, 2022     (TW) ................................... 111116759

(51) Int. Cl.
G06F 1/16          (2006.01)
G09G 3/20          (2006.01)
(52) U.S. Cl.
CPC ......... G09G 3/2092 (2013.01); G06F 1/1601 (2013.01); *G09G 2320/0693* (2013.01); *G09G 2340/0492* (2013.01); *G09G 2360/145* (2013.01); *G09G 2360/16* (2013.01)
(58) Field of Classification Search
CPC .............. G06F 1/1601; G09G 2360/16; G09G 2360/145
See application file for complete search history.

(56) References Cited

U.S. PATENT DOCUMENTS

| | | | |
|---|---|---|---|
| 6,950,098 B2 | 9/2005 | Brabander et al. | |
| 7,894,197 B2* | 2/2011 | Hwang ................. | G01J 1/0266 |
| | | | 361/752 |
| 9,176,005 B2 | 11/2015 | Hogo et al. | |
| 10,062,338 B2 | 8/2018 | Hogo | |

(Continued)

FOREIGN PATENT DOCUMENTS

| | | |
|---|---|---|
| CN | 110036633 A | 7/2019 |
| TW | I334023 B | 12/2010 |
| TW | 201610830 A | 3/2016 |

(Continued)

OTHER PUBLICATIONS

First Office Action in counterpart Taiwan Application No. 111116759, dated Nov. 28, 2023.

*Primary Examiner* — Antonio A Caschera

(57)     ABSTRACT

A display device includes a display and a detection module. The display includes a display surface and a casing, and the casing exposes the display surface. The detection module includes a pivoting component and a sensing component. The pivoting component is disposed on the casing and includes a bearing. The sensing component includes a sensor and a sensing surface. The sensing component is disposed on the bearing and is configured to rotate about an axis of the bearing so that the sensing surface faces the display surface. The sensor is configured to provide a position sensing signal for determining whether the sensing component has rotated to a detection position. A display calibration method is also provided.

8 Claims, 9 Drawing Sheets

100

(56) References Cited

U.S. PATENT DOCUMENTS

2019/0394455 A1 * 12/2019 Hogo ................... H04N 17/004
2020/0025564 A1 * 1/2020 Von Der Waydbrink ...................
                                                      G06F 1/1601

FOREIGN PATENT DOCUMENTS

TW          201909823 A     3/2019
TW          202106425 A     2/2021

* cited by examiner

100

100b

DISPLAY DEVICE AND DISPLAY CALIBRATION METHOD

CROSS-REFERENCE TO RELATED APPLICATION

This application claims the priority benefit of Taiwan application (111116759), filed on May 4, 2022. The entirety of the above-mentioned patent application is hereby incorporated by reference herein and made a part of this specification.

FIELD OF THE INVENTION

The present invention relates to a display device, and more particularly to a display device capable of performing display calibration and a display calibration method.

BACKGROUND OF THE INVENTION

Additional detection elements are required when performing color calibration on commercially available displays, wherein the detection elements are manually moved close to the display surface of the display for detection and calibration. This method may cause inaccurate calibration due to the incorrect position of the detection element, or it takes more time to calibrate. Some displays have integrated the detection element into the casing of the display; however, because the position of the detection element is not confirmed before the color calibration, there are still problems such as the calibration cannot be properly performed or the calibration is inaccurate due to that the detection element may not reach the correct detection position. In addition, the detection element of such a display also needs to be manually placed at the position corresponding to the display surface.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

An embodiment of the present invention provides a display device. Specifically, before performing display calibration, it will be determined whether the position of the sensing element is correct, so as to improve the accuracy of the display device after calibration.

An embodiment of the present invention provides a display calibration method. Specifically, before performing display calibration, it will be determined whether the position of the sensing element is correct, so as to improve the accuracy of the display calibration method.

Other advantages and objectives of the invention may be further illustrated by the technical features broadly embodied and described as follows.

In order to achieve one or a portion of or all of the objectives or other objectives, the display device provided by an embodiment of the present invention includes a display and a detection module. The display includes a display surface and a casing, and the casing exposes the display surface. The detection module includes a pivoting component and a sensing component. The pivoting component is disposed on the casing and includes a bearing. The sensing component includes a sensor and a sensing surface. The sensing component is disposed on the bearing and is configured to rotate about an axis of the bearing so that the sensing surface faces the display surface. The sensor is configured to provide a position sensing signal for determining whether the sensing component has rotated to a detection position.

In an embodiment of the present invention, the sensor includes a light sensor, and the position sensing signal is a brightness signal.

In an embodiment of the present invention, the sensor includes a distance sensor, and the position sensing signal is a distance signal.

In an embodiment of the present invention, the sensor includes a gravity sensor. The gravity sensor is configured to detect a change of gravity when the sensing component rotates, and the position sensing signal is a gravity signal.

In an embodiment of the present invention, the pivoting component further includes a motor, and the motor is connected to the bearing to drive a rotation of the sensing component.

In an embodiment of the present invention, the aforementioned display device further includes a pivoting auxiliary component. The sensing component is disposed on the bearing of the pivoting component through the pivoting auxiliary component. The pivoting component is disposed on a back plate of the casing opposite to the display surface. The pivoting auxiliary component includes an auxiliary bearing, a first pivoting auxiliary rod and a second pivoting auxiliary rod. A first end of the first pivoting auxiliary rod is connected to the bearing of the pivoting component, a second end of the first pivoting auxiliary rod is connected to the auxiliary bearing of the pivoting auxiliary component, and the first pivoting auxiliary rod is configured to rotate about the axis of the bearing. A first end of the second pivoting auxiliary rod is disposed on the auxiliary bearing, a second end of the second pivoting auxiliary rod is connected to the sensing component, and the second pivoting auxiliary rod is configured to rotate about an auxiliary axis of the auxiliary bearing.

In an embodiment of the present invention, the detection module further includes a limiting structure, disposed on the casing of the display and configured to limit the sensing component at an initial position.

In an embodiment of the present invention, the detection module further includes a release button. The limiting structure is linked with the release button. The release button is disposed on a frame of the casing of the display. The limiting structure releases a limiting on the sensing component when the release button is pressed.

In an embodiment of the present invention, a spring is disposed in the bearing, and the sensing component rotates to the detection position based on an elastic force of the spring when a limiting on the sensing component is released.

In order to achieve one or a portion of or all of the objectives or other objectives, the display calibration method provided by an embodiment of the present invention is adapted for use in a display device. The display device includes a display and a detection module. The display includes a display surface, a casing and a driving element. The driving element is electrically connected to a control element. The detection module is electrically connected to the control element and includes a sensing component and a pivoting component. The pivoting component is disposed on the casing. The sensing component rotates through the pivoting component. The display calibration method includes: executing a calibration program by the control component. The calibration program includes: executing a position determination step, in which the sensing component is configured to provide a position sensing signal to the control element for determining whether the sensing component has rotated to a detection position; and executing a color calibration step after it is determined that the sensing component has rotated to the detection position.

In an embodiment of the present invention, the sensing component includes a light sensor, and the position sensing signal is a brightness signal.

In an embodiment of the present invention, the sensing component includes a distance sensor, and the position sensing signal is a distance signal.

In an embodiment of the present invention, the sensing component includes a gravity sensor. The gravity sensor is configured to detect a change of gravity when the sensing component rotates and accordingly generate a gravity signal. The control element is configured to execute the calibration program according to the gravity signal.

In an embodiment of the present invention, the sensing component includes a gravity sensor. The gravity sensor is configured to detect a change of gravity when the sensing component rotates and accordingly generate a gravity signal as the position sensing signal.

In an embodiment of the present invention, the sensing component includes a light sensor. The color calibration step includes: controlling the driving element to drive the display surface to display an image; configuring the light sensor to sense the image on the display surface to obtain color data; generating color compensation data based on the color data; and outputting the color compensation data to the driving element of the display.

In an embodiment of the present invention, the pivoting component further includes a motor. The motor is electrically connected with the control element to drive a rotation of the sensing component.

In an embodiment of the present invention, when it is determined that the sensing component has not rotated to the detection position in the position determination step, the display calibration method further includes: executing a repositioning step, in which the control element controls the sensing component to rotate back to an initial position and then controls the sensing component to rotate to the detection position again.

In an embodiment of the present invention, the sensing component includes a gravity sensor. The gravity sensor generates an abnormal signal when the sensing component encounters a collision when rotating. The gravity sensor outputs the abnormal signal to the control element to execute a repositioning step, in which the control element controls the sensing component to rotate back to an initial position and then controls the sensing component to rotate to the detection position again.

In an embodiment of the present invention, when it is determined that in the position determination step the sensing component does not rotate to the detection position within a specific period, the control element executes a repositioning step, in which the control element controls the sensing component to rotate back to an initial position and then controls the sensing component to rotate to the detection position again.

In an embodiment of the present invention, the control element is disposed on a circuit board of the display device.

In an embodiment of the present invention, the control element is disposed in a computer.

The display device and the display calibration method according to the embodiments of the present invention integrate the detection module on the display device. Before performing the color calibration step, it is determined whether the position of the sensing component used for calibration is correct, and then the color calibration is performed only when it is determined that the sensing component is located at the detection position, so as to effectively avoid the problems of failure of normal calibration or inaccurate calibration or repeated calibration due to that the sensing component does not arrive at the correct detection position, thereby improving the accuracy of the display calibration method and the calibrated display device, and reducing the calibration time.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
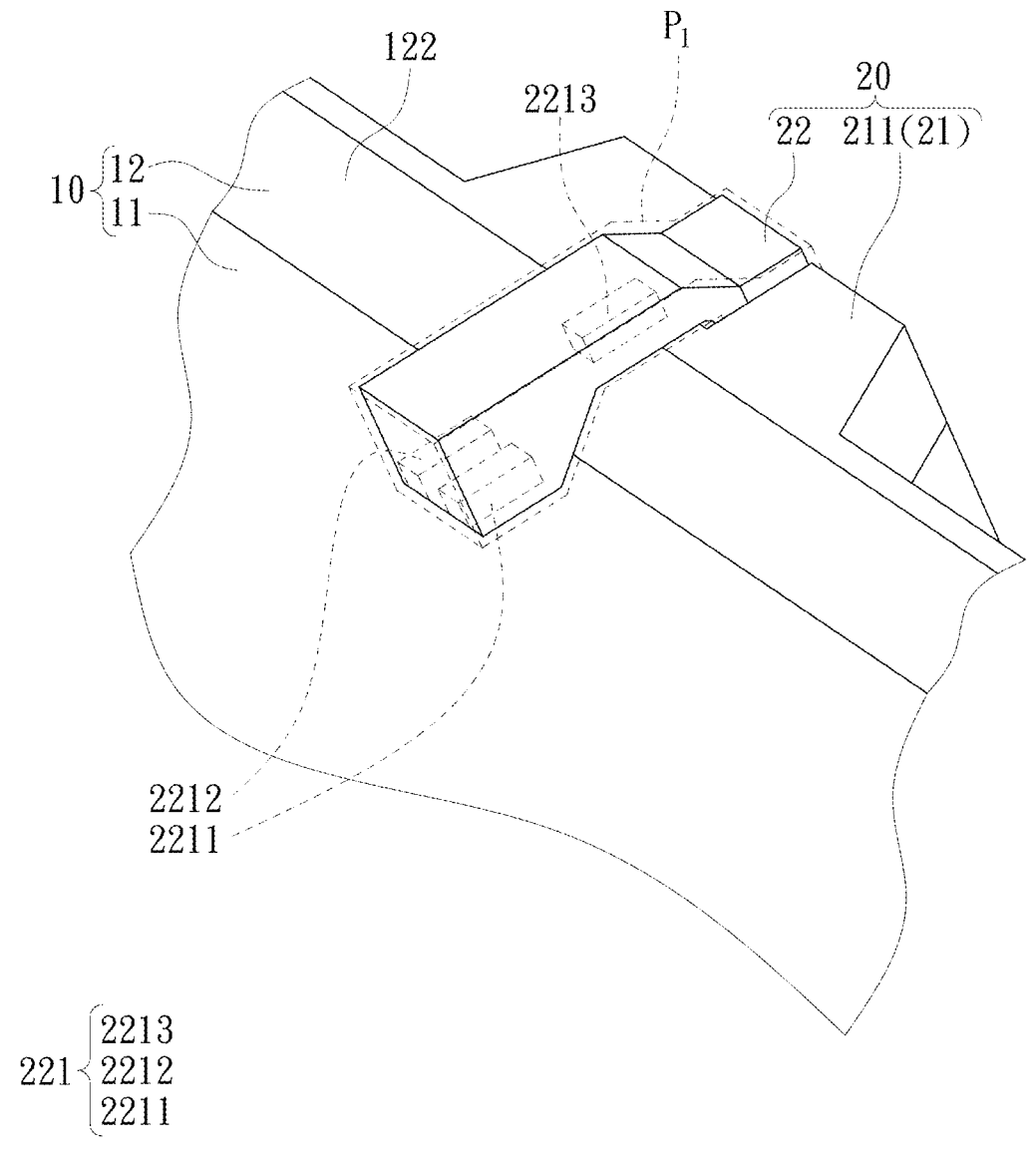
FIG. 1 is a schematic partial front view of a display device according to an embodiment of the present invention, in which a sensing component is located at a detection position.
Figure 2:
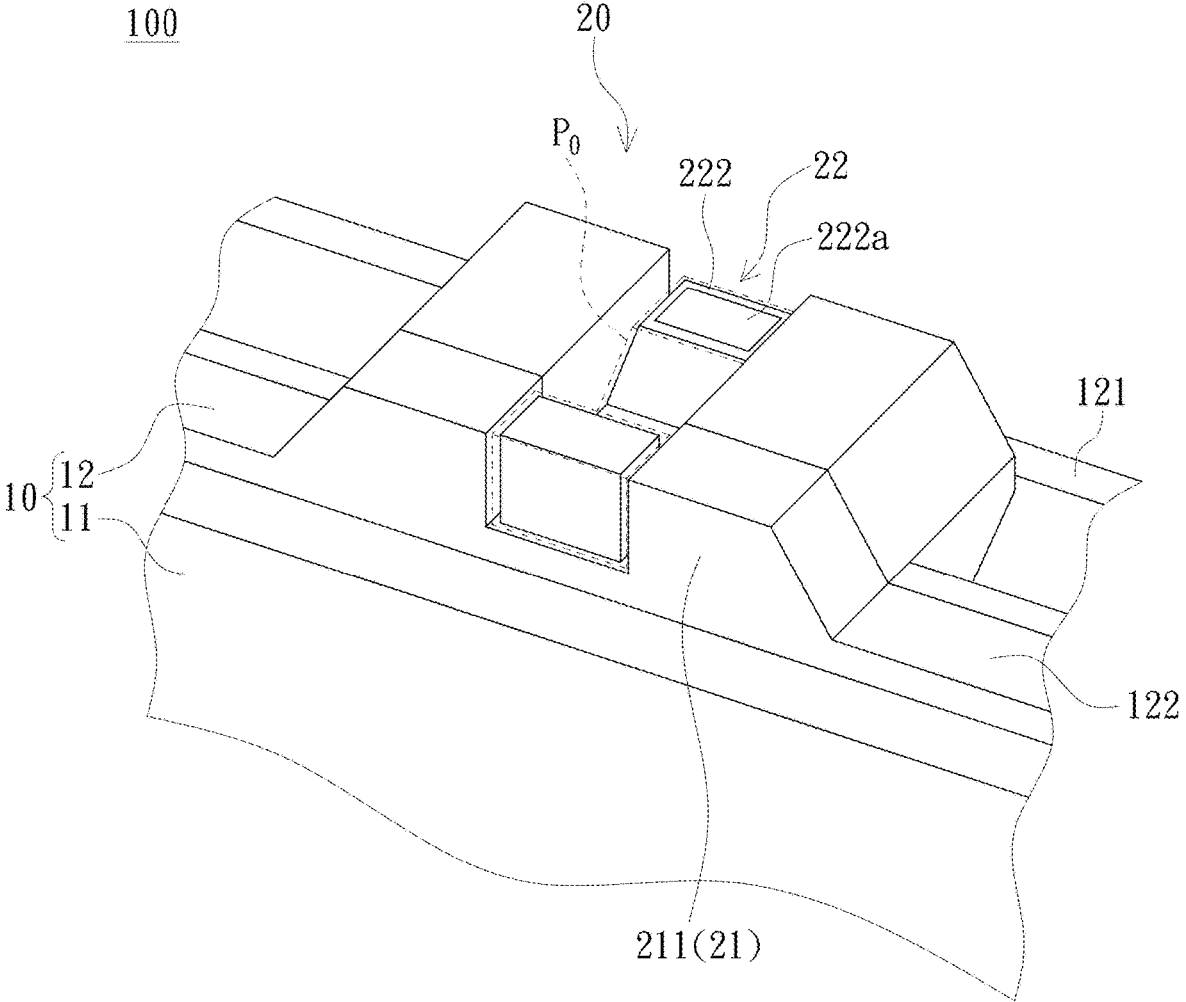
FIG. 2 is a schematic partial top view of a display device according to an embodiment of the present invention, in which a sensing component is located at an initial position.
Figure 3:
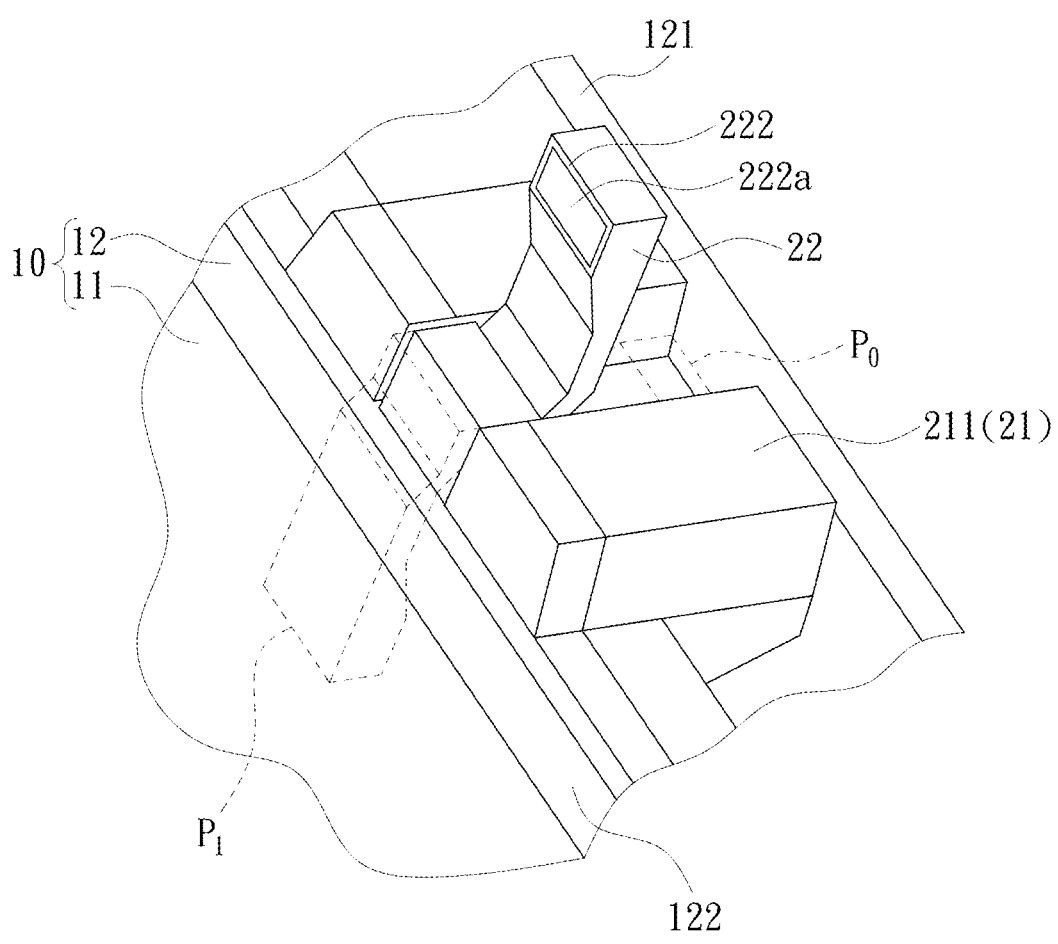
FIG. 3 is a schematic partial top view of a display device according to an embodiment of the present invention, in which the sensing component is rotating.

FIGS. 1 to 3 are schematic views of a display device according to an embodiment of the present invention, in which a sensing component is at a detection position, the sensing component is at an initial position, and the sensing component is rotating, respectively. Specifically, FIG. 1 is a schematic partial front view of the display device 100; and FIGS. 2 and 3 are schematic partial top views of the display device 100. Please refer to FIGS. 1 to 3. The display device 100 includes a display 10 and a detection module 20. The display 10 includes a display surface 11 and a casing 12. The casing 12 includes a back plate 121 and a frame 122. The frame 122 of the casing 12 exposes the display surface 11. The back plate 121 is disposed opposite to the display surface 11. The detection module 20 includes a pivoting component 21 and a sensing component 22. The pivoting component 21 is disposed on the casing 12 and includes a bearing 211. The sensing component 22 includes a sensor 221 and a sensing surface 222. The sensing component 22 is disposed on the bearing 211 and is configured to rotate about the axis of the bearing 211, so that the sensing surface 222 can face the display surface 11. The sensor 221 is configured to provide a position sensing signal for determining whether the sensing component 22 has rotated to the detection position $P_1$. A calibration program of the display 10 is executed when it is determined that the sensing component 22 has rotated to the detection position $P_1$, so as to avoid the problems of failure of normal calibration or inaccurate calibration or repeated calibration caused by that the calibration program is executed but the sensing component 22 has not reaches the correct detection position $P_1$.

FIGS. 2 and 3 show the top surface of the display 10. In one embodiment, the bearing 211 of the pivoting component 21 of the detection module 20 is disposed on one side of the casing 12. For example, the pivoting component 21 may be disposed on the frame 122 at the top surface of the display 10. In this embodiment, the pivoting component 21 may have an accommodating space. It is defined that the sensing component 22 is located at the initial position $P_0$ when the sensing component 22 rotates about the axis of the bearing 211 and is located in the accommodating space. In addition, when the sensing component 22 is located at the initial position $P_0$, the sensing surface 222 of the sensing component 22 may, for example, face away from the top surface of the display 10 or face away from the display surface 11 of the display 10, depending on the structural design of the pivoting component 21, and the sensing component 22 may be further configured, for example, to detect ambient light at this time. As shown in FIG. 3, the sensing component 22 can rotate from the initial position $P_0$ to the detection position $P_1$, and the rotation range from the initial position $P_0$ to the detection position $P_1$ may be, for example, 270°. In other embodiments, the rotation range from the initial position $P_0$ to the detection position $P_1$ can be, for example, 180°, and the present invention is not limited thereto.

Please continue to refer to FIGS. 1 to 3. The sensor 221 in the sensing component 22 may include at least one of a light sensor 2211, a distance sensor 2212 and a gravity sensor 2213. The light sensor 2211 is configured to detect the brightness of the display surface 11 and accordingly output a brightness signal. The sensing surface 222 of the sensing component 22 has, for example, a light-transmitting portion 222a, so that the light from the display surface 11 can pass through the light-transmitting portion 222a and is transmitted to the light sensor 2211. In one embodiment, when the sensing component 22 rotates about the axis of the bearing 211 so that the sensing surface 222 faces the display surface 11, the light sensor 2211 detects the brightness of the display surface 11 to provide a brightness signal to a control element 30 (shown in FIG. 4) as the position sensing signal. The control element 30 determines whether the sensing component 22 has rotated to the detection position $P_1$ according to the brightness signal and a brightness threshold. For example, the control element 30 determines that the sensing component 22 has not rotated to the detection position $P_1$ when the brightness value in the brightness signal is less than the brightness threshold; and the control element 30 determines that the sensing component 22 has rotated to the detection position $P_1$ when the brightness value in the brightness signal is greater than the brightness threshold.

Similarly, the distance sensor 2212 is configured to detect the distance from the sensing surface 222 to the display surface 11 when the sensing surface 222 faces the display surface 11 and accordingly output a distance signal to the control element 30 as the position sensing signal. The control element 30 determines whether the sensing component 22 has rotated to the detection position $P_1$ according to the distance signal and a distance setting value. For example, the control element 30 determines that the sensing component 22 has not rotated to the detection position $P_1$ when it is detected that the distance from the sensing surface 222 to the display surface 11 is greater than the distance setting value; and the control element 30 determines that the sensing component 22 has rotated to the detection position $P_1$ when the distance sensor 2212 detects that the distance from the sensing surface 222 to the display surface 11 is equal to the distance setting value. In one embodiment, the distance sensor 2212 can be, for example, an infrared sensor, and is disposed corresponding to the light-transmitting portion 222a of the sensing surface 222.

In addition, the sensor 221 of the sensing component 22 may further include a gravity sensor 2213. The gravity sensor 2213 is configured to detect the change of gravity when the sensing component 22 rotates and accordingly generate a gravity signal to the control element 30 as the position sensing signal. The control element 30 determines whether the sensing component 22 has rotated to the detection position $P_1$ according to the change of gravity. The gravity sensor 2213 can be, for example, an acceleration sensor configured to detect the rotation angle of the sensing component 22, such as 270° or 180°. In one embodiment in which the rotation range from the initial position $P_0$ to the detection position $P_1$ is 270°, the control element 30 determines that the sensing component 22 has rotated to the detection position $P_1$ when the gravity sensor 2213 detects that the sensing component 22 has rotated 270°; and the control element 30 determines that the sensing component 22 has not rotated to the detection position $P_1$ when the gravity sensor 2213 does not detect that the sensing component 22 has rotated 270°. In another embodiment, when the sensing component 22 encounters a collision when rotating, the gravity sensor 2213 can detect the collision and output an abnormal signal.

Figure 4:
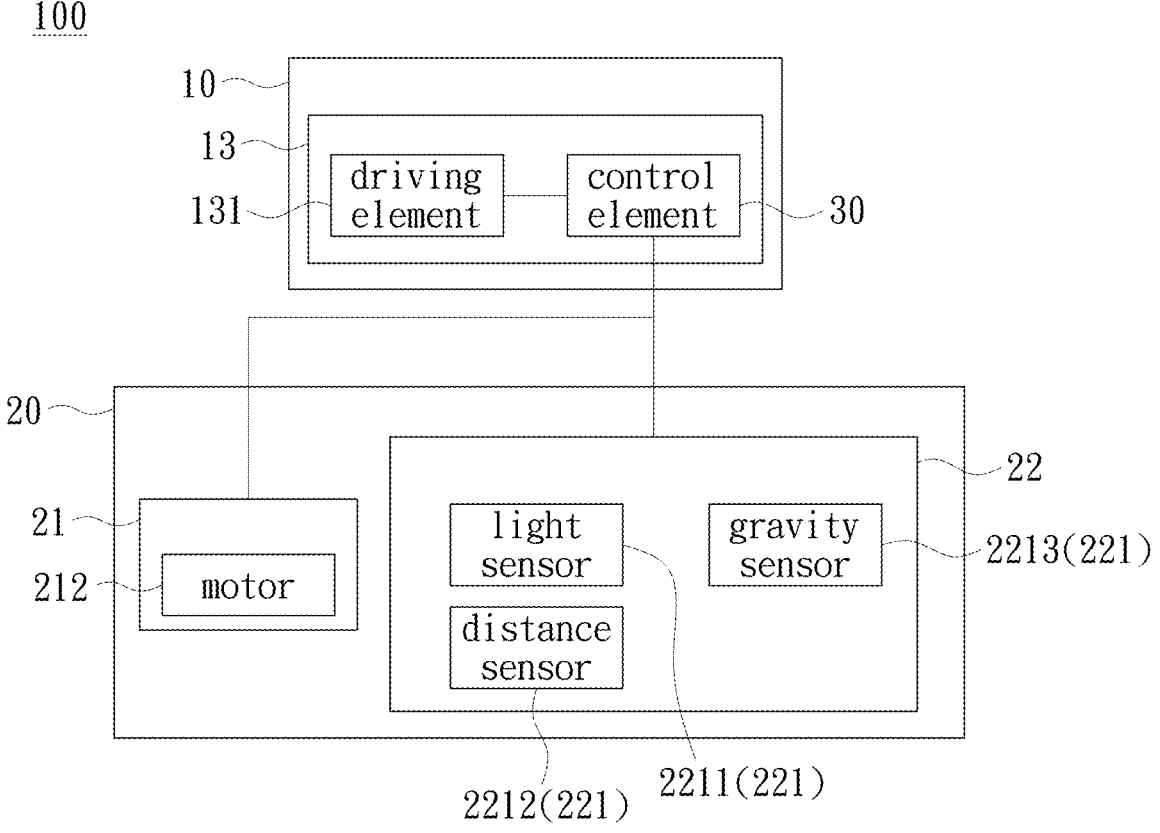
FIG. 4 is a schematic block diagram of a display device according to an embodiment of the present invention.

FIG. 4 is a schematic block diagram of a display device according to an embodiment of the present invention. Please refer to FIGS. 3 and 4. In one embodiment, the display 10 of the display device 100 may further include a circuit board 13. The circuit board 13 includes a driving element 131 and a control element 30. The driving element 131 can be a display driving chip configured to control the display 10 to display images. The control element 30 is electrically connected to the light sensor 2211, the distance sensor 2212 and the gravity sensor 2213 of the sensor 221 of the detection module 20 and is configured to execute a calibration program. In one embodiment, the pivoting component 21 may further include a motor 212. The motor 212 is electrically connected to the control element 30. The motor 212 is connected to the bearing 211 to drive the rotation of the sensing component 22. The arrangement of the motor 212 allows the sensing component 22 to automatically rotate between the initial position $P_0$ and the detection position $P_1$ without requiring the user to manually operate the sensing component 22.

Figure 5:
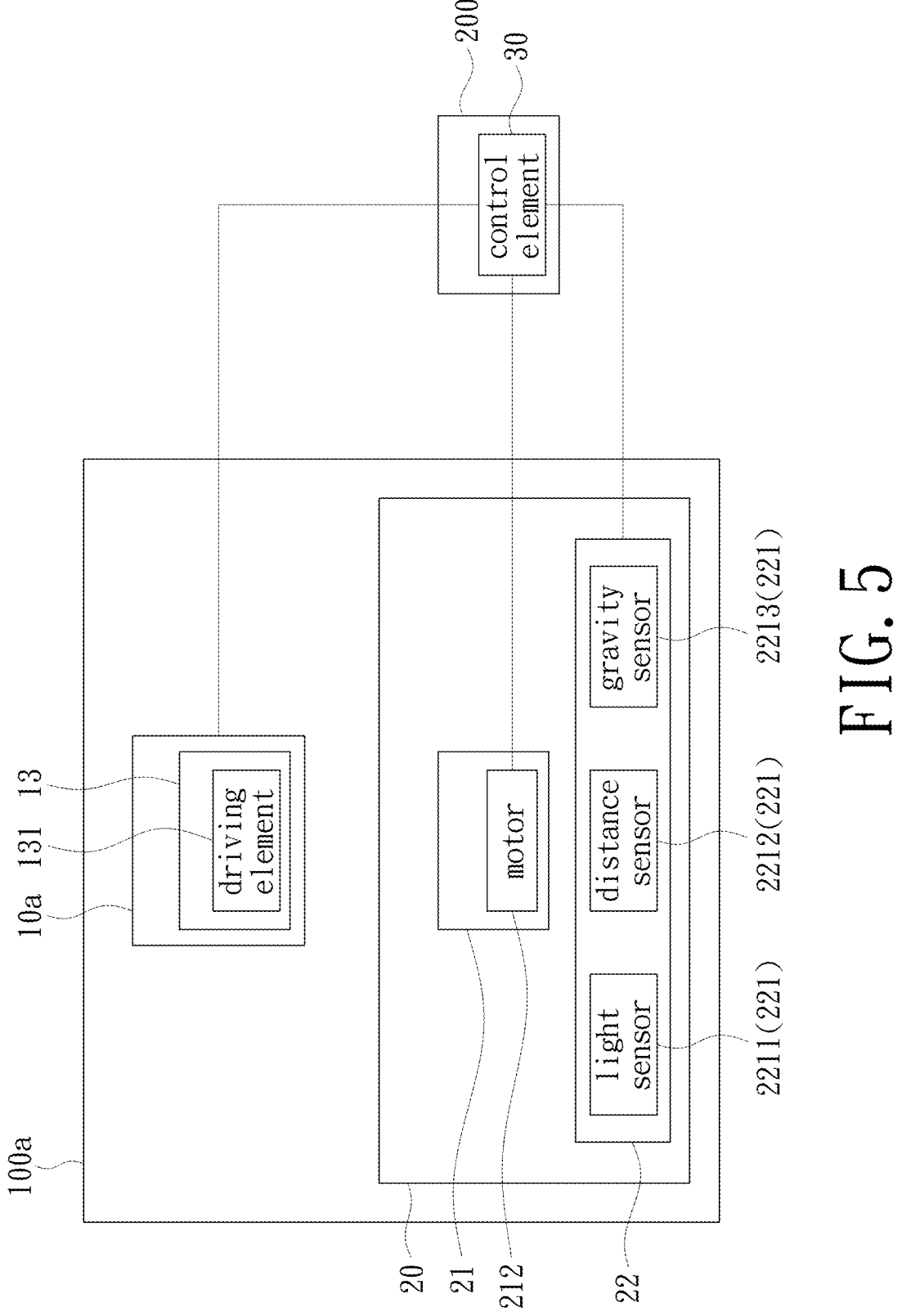
FIG. 5 is a schematic block diagram of a display device according to another embodiment of the present invention, in which a control element is disposed in a computer.

FIG. 5 is a schematic block diagram of a display device according to another embodiment of the present invention, in which the control element 30 is disposed in a computer 200. The driving element 131 of the circuit board 13 of the display 10a and the detection module 20 of the display device 100a in this embodiment are the same as those in the above-mentioned embodiment. The main difference is that the control element 30 in this embodiment can be disposed in, for example, the computer 200 that is electrically connected to the display 10a of the display device 100a. Specifically, the control element 30 disposed in the computer 200 is electrically connected with the driving element 131 of the circuit board 13 in the display 10a; and the control element 30 is electrically connected with the motor 212 in the pivoting component 21 of the detection module 20. The motor 212 is connected with the bearing 211 (shown in FIG. 1), so that the control element 30 can control the motor 212 to drive the rotation of the sensing component 22.

Figure 6:
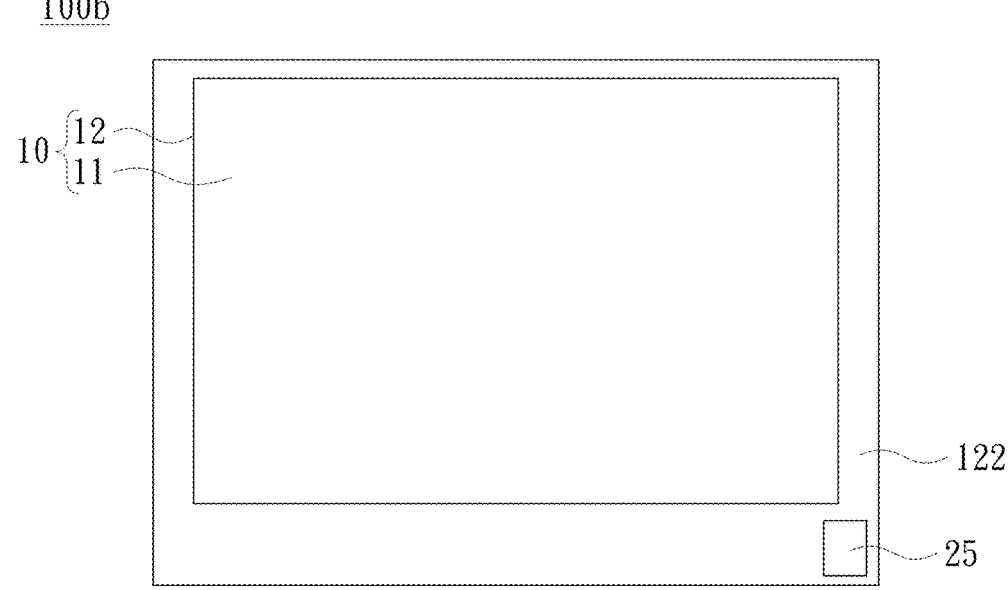
FIG. 6 is a schematic front view of a display device according to another embodiment of the present invention.
Figure 7:
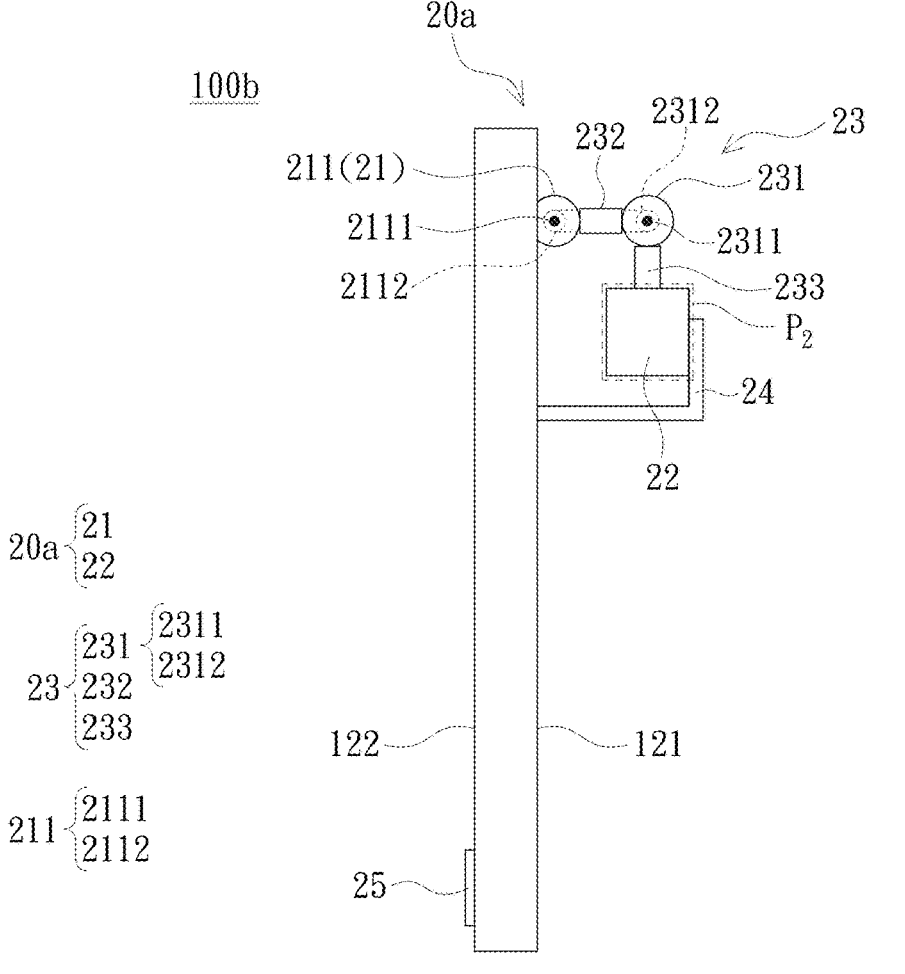
FIG. 7 is a schematic side view of a display device according to another embodiment of the present invention.

FIGS. 6 and 7 are a schematic front view and a schematic side view of a display device according to another embodiment of the present invention, respectively. Please refer to FIGS. 6 and 7. The display 10 and the sensing component 22 of the detection module 20a of the display device 100b in this embodiment are the same as those in the above-mentioned embodiment, and no redundant detail is to be given herein. The detection module 20a of the display device 100b may further include a pivoting auxiliary component 23, and the pivoting component 21 may be disposed on the back plate 121 of the casing 12 opposite to the display surface 11. In this embodiment, the sensing component 22 is disposed on the bearing 211 of the pivoting component 21 through the pivoting auxiliary component 23. The pivoting auxiliary component 23 includes, for example, an auxiliary bearing 231, a first pivoting auxiliary rod 232 and a second pivoting auxiliary rod 233. In this embodiment, the pivoting component 21 is disposed on the back plate 121 of the casing 12, one end of the first pivoting auxiliary rod 232 is connected to the bearing 211 of the pivoting component 21, the other end of the first pivoting auxiliary rod 232 is connected to the auxiliary bearing 231 of the pivoting auxiliary component 23, and the first pivoting auxiliary rod 232 is configured to rotate about the axis 2111 of the bearing 211. In addition, one end of the second pivoting auxiliary rod 233 is disposed on the auxiliary bearing 231, the other end of the second pivoting auxiliary rod 233 is connected to the sensing component 22, and the second pivoting auxiliary rod 233 is configured to rotate about the auxiliary axis 2311 of the auxiliary bearing 231, thereby driving the sensing component 22 to rotate relative to the auxiliary bearing 231. By providing two or more bearings (e.g., the sensing component 22 rotating relative to the bearing 211 and the auxiliary bearing 231) in the detection module 20a of this embodiment, the overall rotation range of the sensing component 22 is larger (e.g., greater than 270°). Therefore, the pivoting component 21 can be disposed, for example, on the back plate 121 of the casing 12 of the display 10, so as to hide the detection module 20a on the back of the display 10. Thus, it can avoid the design taste problem in which the frame 122 of the display 10 is wider or thicker due to the detection module 20a is disposed on the frame 122 of the display 10.

Please continue to refer to FIG. 7. In one embodiment, the detection module 20a may further include a limiting structure 24, and the limiting structure 24 is disposed on the casing 12 of the display 10. Specifically, the limiting structure 24 may be disposed on the back plate 121 of the casing 12, as shown in FIG. 7. The limiting structure 24 is configured to limit the sensing component 22 at the initial position $P_2$. The limiting structure 24 can be a baffle as shown in FIG. 7, but the present invention is not limited thereto. In other embodiments, the limiting structure 24 can be a clamping member that can limit the sensing component 22 to a specific position. By fixing the sensing component 22 at the initial position $P_2$ through the limiting structure 24, the damage due to exposing the sensing component 22 can be avoided when no calibration program is required or when the display 10 is moved. In addition, the detection module 20 of the display device 100 shown in FIGS. 1 to 3 may also include a limiting structure.

In the embodiment including the limiting structure 24, the detection module 20a of the display device 100b may further include a release button 25, and the limiting structure 24 is linked with the release button 25. The release button 25 may be disposed, for example, on the frame 122 of the casing 12 around the display surface 11 of the display 10. The limiting structure 24 releases the limiting on the sensing component 22 when the release button 25 is pressed. The linkage between the limiting structure 24 and the release button 25 may be a structural linkage. For example, the limiting on the sensing component 22 is released when the release button 25 is pressed and therefore the limiting structure 24 is displaced to move away from the sensing component 22. The linkage between the limiting structure 24 and the release button 25 can also be an electrical linkage. For example, when the release button 25 is pressed, a signal for releasing the limit is sent to the control element 30, and the control element 30 controls the limiting structure 24 to release the limiting on the sensing component 22 according to the received signal. In addition, the user can visually observe whether the release button 25 is pressed to determine the position of the sensing component 22.

Please continue to refer to FIG. 7. In another embodiment including the limiting structure 24, a spring 2112 may be provided in the bearing 211 of the pivoting component 21 of the detection module 20a of the display device 100b. When the sensing component 22 is located at the initial position $P_2$, the sensing component 22 is limited at the initial position $P_2$ by the limiting structure 24 resisting the elastic force of the spring 2112. When the limiting structure 24 releases the limiting on the sensing component 22, the sensing component 22 can rotate to the detection position $P_1$ (shown in FIG. 3) through the elastic force of the spring 2112. In one embodiment, the pivoting component 21 of the detection module 20a is disposed on the back plate 121 of the casing 12 of the display 10, the display device 10 further includes a pivoting auxiliary component 23 connected to the pivoting component 21, and the auxiliary bearing 231 of the pivoting auxiliary component 23 may also include an auxiliary spring 2312. In this embodiment, when the limiting structure 24 releases the limiting on the sensing component 22, the sensing component 22 can be turned from the back to the front of the display 10 through the spring 2112 in the bearing 211 and the auxiliary spring 2312 in the auxiliary bearing 231, and therefore the sensing surface 222 can face the display surface 11. In addition, the bearing 211 of the pivoting component 21 of the detection module 20 may also include a spring in the embodiment shown in FIGS. 1 to 3.

Figure 8:
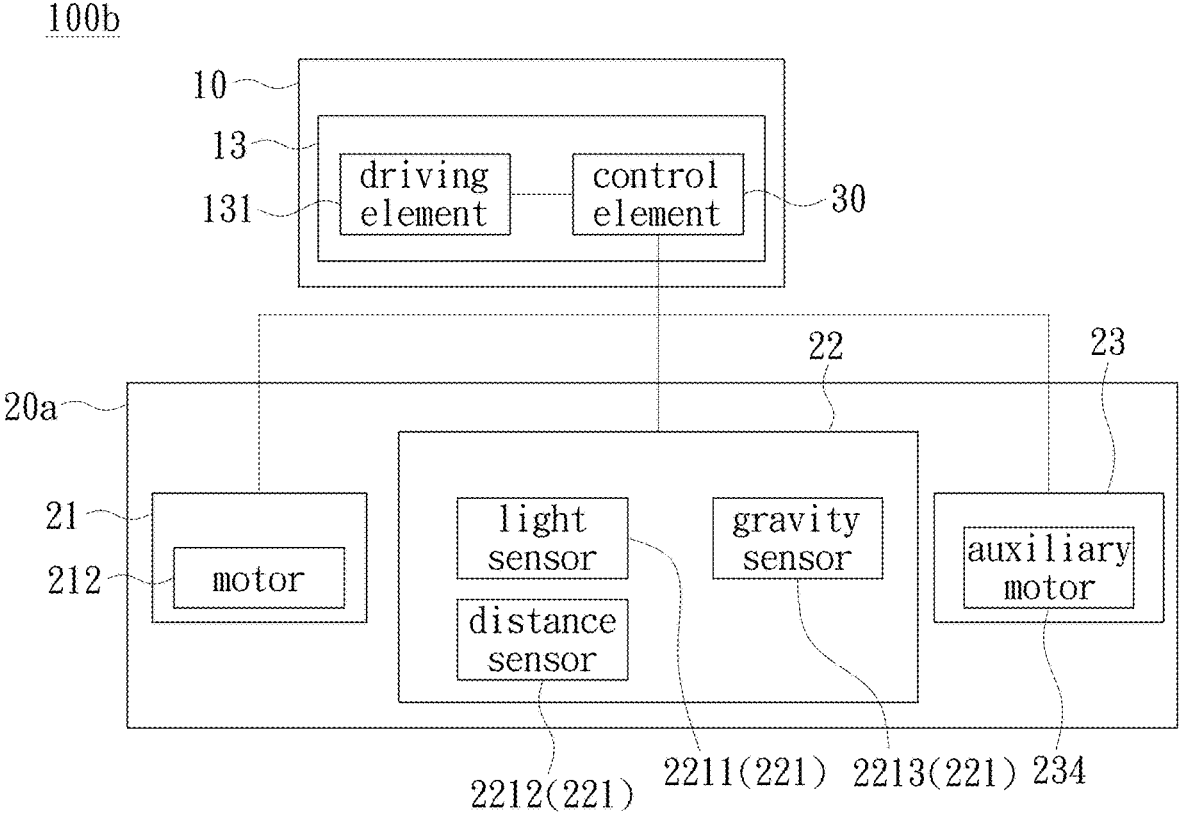
FIG. 8 is a schematic block diagram of a display device according to another embodiment of the present invention.

FIG. 8 is a schematic block diagram of a display device according to another embodiment of the present invention. Please refer to FIG. 8. The display 10 of the display device 100b in this embodiment is the same as the display 10 of the display device 100 shown in FIG. 4; that is, the display 10 includes a circuit board 13, and the circuit board 13 includes a driving element 131 and a control element 30. The difference is that the pivoting auxiliary component 23 of the detection module 20a of the display device 100b may further include an auxiliary motor 234, and the pivoting component 21 includes a motor 212. The control element 30 is electrically connected to the motor 212 and the auxiliary motor 234, the motor 212 is connected to the bearing 211 (shown in FIG. 7), and the auxiliary motor 234 is connected to the auxiliary bearing 231 (shown in FIG. 7), so that the sensing component 22 can be automatically turned from the back to the front of the display 10, and therefore the sensing surface 222 can face the display surface 11.

Figure 9:
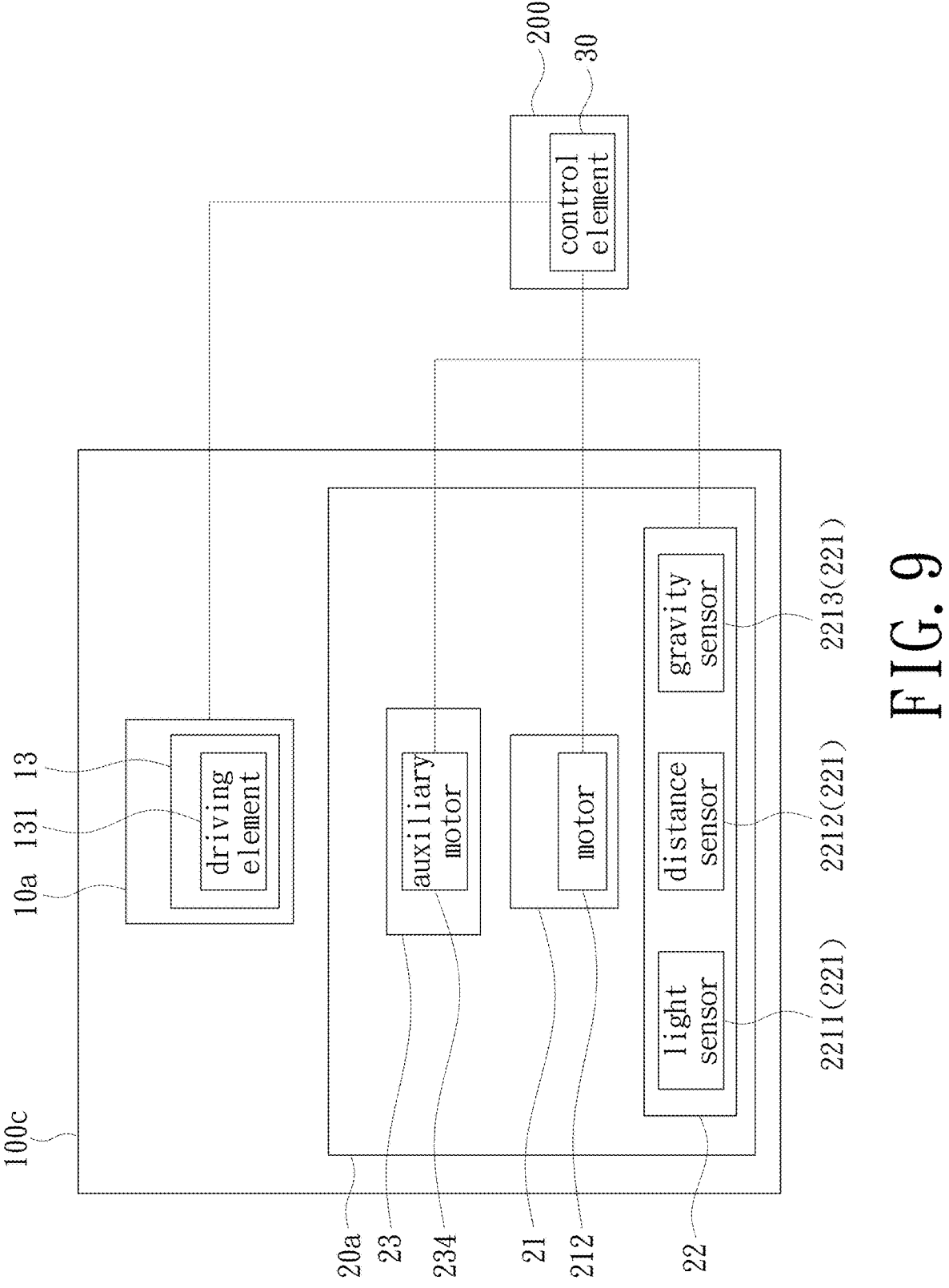
FIG. 9 is a schematic block diagram of a display device according to another embodiment of the present invention, in which a control element is disposed in a computer.

FIG. 9 is a schematic block diagram of a display device according to another embodiment of the present invention, in which the control element 30 is disposed in a computer 200. Please refer to FIG. 9. The detection module 20a of the display device 100c in FIG. 9 is the same as the detection module 20a of the display device 100b in FIG. 8, and no redundant detail is to be given herein. The display 10a of the display device 100c is electrically connected to the computer 200, and the control element 30 is disposed in the computer 200. The control element 30 is electrically connected to the motor 212 and the auxiliary motor 234, the motor 212 is connected to the bearing 211 (shown in FIG. 7), and the auxiliary motor 234 is connected to the auxiliary bearing 231 (shown in FIG. 7), so that the sensing component 22 can be automatically turned from the back to the front of the display 10a, and therefore the sensing surface 222 can face the display surface 11.

Figure 10:
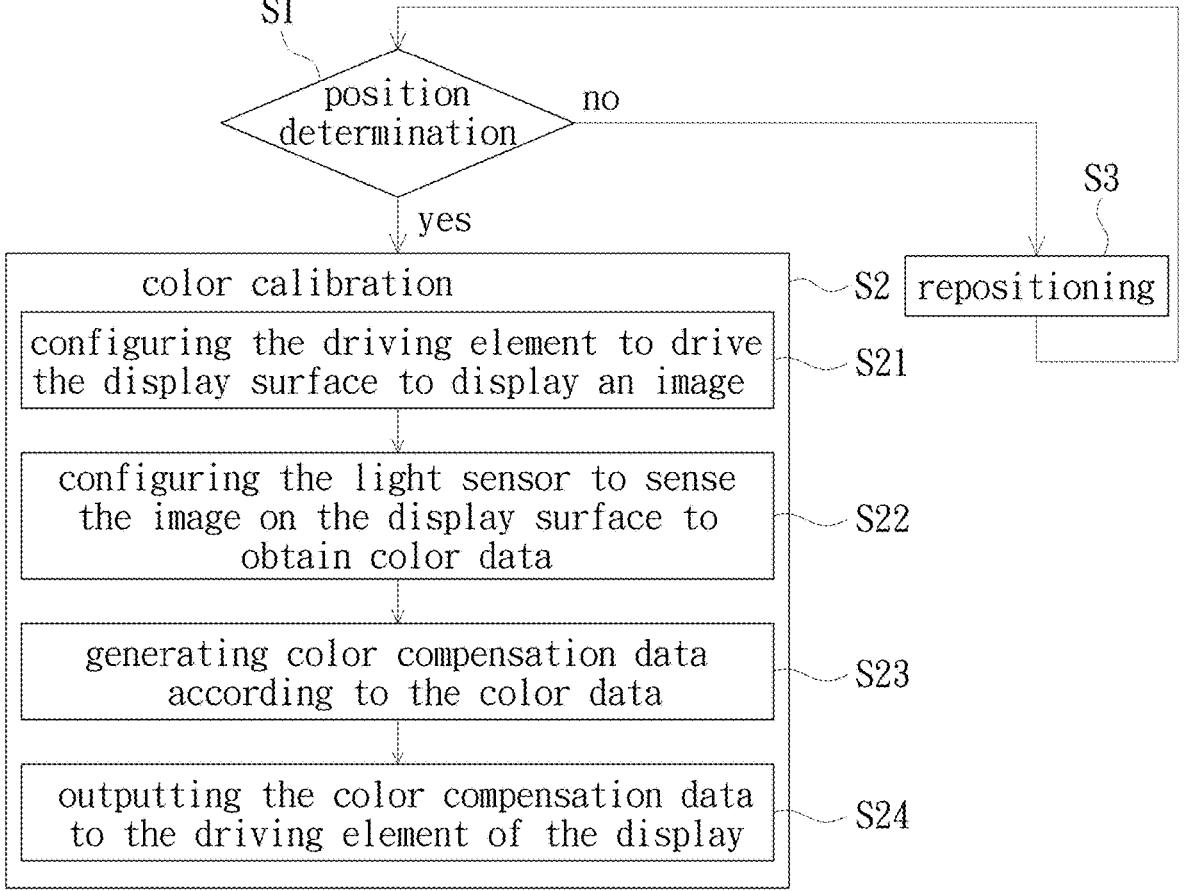
FIG. 10 is a schematic flowchart of a display calibration method according to an embodiment of the present invention.

FIG. 10 is a schematic flowchart of a display calibration method according to an embodiment of the present invention. Please refer to FIGS. 3-5 and 10. The display calibration method according to an embodiment of the present invention will be described below by taking the display device 100 as an example. The display device 100 includes a display 10 and a detection module 20. In addition to the display surface 11 and the casing 12, the display 10 further includes a driving element 131. The driving element 131 is electrically connected to the control element 30. The detection module 20 is electrically connected to the control element 30 and includes a pivoting component 21 and a sensing component 22. The pivoting component 21 is disposed on the casing 12, and the sensing component 22 rotates through the pivoting component 21. The control element 30 may be disposed on the circuit board 13 of the display 10 as shown in FIG. 4, or may be disposed in the external computer 200 connected to the display device 100a as shown in FIG. 5.

The display calibration method includes executing a calibration program by the control element 30. The calibration program includes: a position determination step (step S1) and a color calibration step (step S2). In step S1, the sensing component 22 is configured to provide a position sensing signal to the control element 30 for determining whether the sensing component 22 has rotated to the detection position $P_1$. Step S2 is performed when it is determined that the sensing component 22 has rotated to the detection position $P_1$. The step of determining whether the position of the sensing component used for calibration is correct is performed before the color calibration step, so as to effectively avoid the problems of failure of normal calibration or inaccurate calibration or repeated calibration due to that the sensing component does not arrive at the correct detection position.

In one embodiment, the control element 30 includes the calibration program and can be electrically connected with the detection module 20 and the driving element 131 to perform the position determination step (step S1) and the color calibration step (step S2).

Specifically, the sensing component 22 may include at least one of a light sensor 2211, a distance sensor 2212 and a gravity sensor 2213. The light sensor 2211 is configured to detect the brightness of the display surface 11 and accordingly output a brightness signal to the control element 30. In step S1, when the sensing component 22 rotates about the axis of the bearing 211 so that the sensing surface 222 faces the display surface 11, the light sensor 2211 detects the brightness of the display surface 11 to provide a brightness signal to the control element 30 as a position sensing signal; and then the control element 30 determines whether the sensing component 22 has rotated to the detection position $P_1$ according to the brightness signal and a brightness threshold. For example, the control element 30 determines that the sensing component 22 has not rotated to the detection position $P_1$ when the brightness value in the brightness signal is less than the brightness threshold; and the control element 30 determines that the sensing component 22 has rotated to the detection position $P_1$ when the brightness value in the brightness signal is greater than the brightness threshold.

In one embodiment, the distance sensor 2212 is configured to detect the distance from the sensing surface 222 of the sensing component 22 to the display surface 11 and accordingly output a distance signal to the control element 30 as a position sensing signal. For example, in step S1, the control element 30 determines that the sensing component 22 has not rotated to the detection position $P_1$ when the distance sensor 2212 detects that the distance from the sensing surface 222 to the display surface 11 is greater than a distance setting value; and the control element 30 determines that the sensing component 22 has rotated to the detection position $P_1$ when the distance sensor 2212 detects that the distance from the sensing surface 222 to the display surface 11 is equal to the distance setting value. In one embodiment, the distance setting value may be, for example, 1 cm.

In one embodiment, the gravity sensor 2213 is configured to detect the change of gravity when the sensing component 22 rotates and accordingly generate a gravity signal to the control element 30 as a position sensing signal, and the control element 30 determines whether the sensing component 22 has rotated to the detection position $P_1$ according to the change of gravity. The gravity sensor 2213 can be, for example, an acceleration sensor configured to detect the rotation angle of the sensing component 22, such as 270° or 180°. In one embodiment, the rotation range from the initial position $P_0$ to the detection position $P_1$ is, for example, 270°, then the control element 30 determines that the sensing component 22 has rotated to the detection position $P_1$ when the gravity sensor 2213 detects that the sensing component 22 has rotated 270°; and the control element 30 determines that the sensing component 22 has not rotated to the detection position $P_1$ when the gravity sensor 2213 detects that the sensing component 22 has not rotated 270°.

In another embodiment, the control element 30 can further start the calibration program based on the gravity signal generated by the gravity sensor 2213. For example, it is determined that the user is turning over the sensing component 22 when the gravity sensor 2213 detects that the sensing component 22 is rotating, thus, the control element 30 determines that the user desires to perform a display calibration based on the gravity signal and therefore starts the calibration program. However, the present invention is not limited thereto, and the user may start the calibration program in other ways.

The pivoting component 21 of the detection module 20 of the display device 100 may further include a motor 212. The motor 212 is connected to the bearing 211 of the pivoting component 21 to drive the rotation of the sensing component 22. In this embodiment, the control element 30 can be further electrically connected with the motor 212 of the pivoting component 21. The control element 30 controls the motor 212 to drive the sensing component 22 to rotate to the detection position $P_1$ or the initial position $P_0$.

In one embodiment, when it is determined in the position determination of step S1 that the sensing component 22 has not rotated to the detection position $P_1$, the display calibration method further includes: a repositioning step (step S3). In one embodiment, the control element 30 rotates the sensing component 22 through the motor 212 to return to the initial position $P_1$, and then rotates the sensing element 22 again to the detection position $P_1$. When the control element 30 determines that the sensing component 22 has not rotated to the detection position $P_1$ where the color calibration step (step S2) can be performed, the repositioning step (step S3) is performed automatically, instead of manually, to rotate the sensing component 22 again, thereby improving the automation of the display calibration method.

As described above, the calibration program may further include: a repositioning step (step S3). In one embodiment, when it is determined in the position determination of step S1 that the sensing component 22 does not rotate to the detection position $P_1$ within a specific period (e.g., 3 seconds), the control element 30 performs step S3, in which the control element 30 rotates the sensing component 22 through the motor 212 to return to the initial position $P_0$, and then rotate the sensing component 22 again to the detection position $P_1$.

In addition, in the embodiment in which the display device 100 includes the gravity sensor 2213 and the pivoting component 21 includes the motor 212, the gravity sensor 2213 may be configured to detect whether the sensing component 22 encounters a collision when rotating. The gravity sensor 2213 outputs an abnormal signal to the control element 30 when a collision is detected, and the control element 30 performs the repositioning step (step S3), in which the control element 30 rotates the sensing component 22 through the motor 212 to return to the initial position $P_0$, and then rotate the sensing component 22 again to the detection position $P_1$. In other words, the rotation path of the sensing component 22 is likely to be affected when the gravity sensor 2213 detects that the sensing component 22 encounters a collision, and therefore the sensing component 22 cannot be accurately rotated to the detection position $P_1$. Thus, the gravity sensor 2213 immediately outputs an abnormal signal when detecting a collision, so that the rotation stroke of the sensing component 22 is repeated once, that is, the sensing component 22 returns to the initial position $P_0$ and rotates to the detection position $P_1$ again. Repositioning can be performed in advance, thereby saving time for display calibration and improving efficiency.

Please refer to FIG. 10 again. In the embodiment in which the sensing component 22 includes the light sensor 2211 and the light sensor 2211 can also be used as a color sensor, the color calibration step (step S2) includes: controlling the driving element 131 to drive the display surface 11 to display an image (step S21); configuring the light sensor 2211 to sense the image on the display surface 11 to obtain color data (step S22); generating color compensation data according to the color data (step S23); and outputting the color compensation data to the driving element 131 of the display 10 (step S24). In other words, in this embodiment, in addition to sensing the image of the display surface 11 to perform the color calibration step (step S2), the light sensor 2211 is also configured to detect whether the sensing component 22 has rotated to the detection position $P_1$.

In the embodiment in which the sensing component 22 of the detection module 20 does not include the light sensor 2211 or the light sensor 2211 can only be used for detecting brightness, the detection module 20 may further include a light sensor for detecting color to perform step S2.

The display device and the display calibration method according to the embodiments of the present invention integrate the detection module on the display device. Before performing the color calibration step, it is determined whether the position of the sensing component used for calibration is correct, and then the color calibration is performed only when it is determined that the sensing component is located at the detection position, so as to effectively avoid the problems of failure of normal calibration or inaccurate calibration or repeated calibration due to that the sensing component does not arrive at the correct detection position, thereby improving the accuracy of the display calibration method and the calibrated display device, and reducing the calibration time.

Furthermore, the sensing component of the embodiment of the present invention includes a gravity sensor. The control element detects the change of gravity of the sensing component through the gravity sensor to determine the rotation of the sensing component and therefore to execute the calibration program, thereby improving the degree of automation of the display calibration method. In addition, the control element can also be connected with the motor of the pivoting component, and the motor is connected with the bearing of the pivoting component to control the rotation of the sensing component. Thus, the repositioning step can be performed automatically when it is determined that the sensing component has not rotated to the detection position.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first pivoting auxiliary rod and the second pivoting auxiliary rod are only used for distinguishing various elements and do not limit the number of the elements.

What is claimed is:

1. A display device, comprising:
a display, comprising a display surface and a casing, wherein the casing exposes the display surface; and
a detection module, comprising:

a pivoting component, disposed on the casing and comprising a bearing; and
a sensing component, comprising at least one sensor and a sensing surface, wherein the sensing component is disposed on the bearing and is configured to rotate about an axis of the bearing so that the sensing surface faces the display surface, and the at least one sensor is configured to provide a position sensing signal for determining whether the sensing component has rotated to a detection position;
the display device further comprising a pivoting auxiliary component, wherein the sensing component is disposed on the bearing of the pivoting component through the pivoting auxiliary component, the pivoting component is disposed on a back plate of the casing opposite to the display surface, the pivoting auxiliary component comprises an auxiliary bearing, a first pivoting auxiliary rod and a second pivoting auxiliary rod, a first end of the first pivoting auxiliary rod is connected to the bearing of the pivoting component, a second end of the first pivoting auxiliary rod is connected to the auxiliary bearing of the pivoting auxiliary component, the first pivoting auxiliary rod is configured to rotate about the axis of the bearing, a first end of the second pivoting auxiliary rod is disposed on the auxiliary bearing, a second end of the second pivoting auxiliary rod is connected to the sensing component, and the second pivoting auxiliary rod is configured to rotate about an auxiliary axis of the auxiliary bearing.

2. The display device according to claim 1, wherein the at least one sensor comprises a light sensor, and the position sensing signal is a brightness signal.

3. The display device according to claim 1, wherein the at least one sensor comprises a distance sensor, and the position sensing signal is a distance signal.

4. The display device according to claim 1, wherein the at least one sensor comprises a gravity sensor, the gravity sensor is configured to detect a change of gravity when the sensing component rotates, and the position sensing signal is a gravity signal.

5. The display device according to claim 1, wherein the pivoting component further comprises a motor, and the motor is connected to the bearing to drive a rotation of the sensing component.

6. The display device according to claim 1, wherein the detection module further comprises a limiting structure, the limiting structure is disposed on the casing of the display and configured to limit the sensing component at an initial position.

7. The display device according to claim 6, wherein the detection module further comprises a release button, the limiting structure is linked with the release button, the release button is disposed on a frame of the casing of the display, and the limiting structure releases a limiting on the sensing component when the release button is pressed.

8. The display device according to claim 6, wherein a spring is disposed in the bearing, and the sensing component rotates to the detection position based on an elastic force of the spring when a limiting on the sensing component is released.

* * * * *